(No Model.)
S. D. REYNOLDS.
SPRING FOR VEHICLES.
No. 546,345. Patented Sept. 17, 1895.
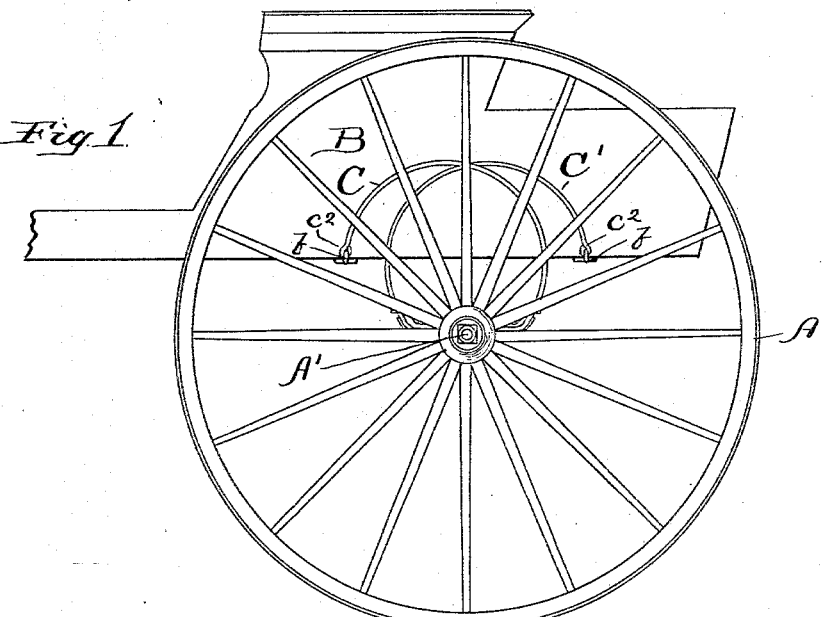
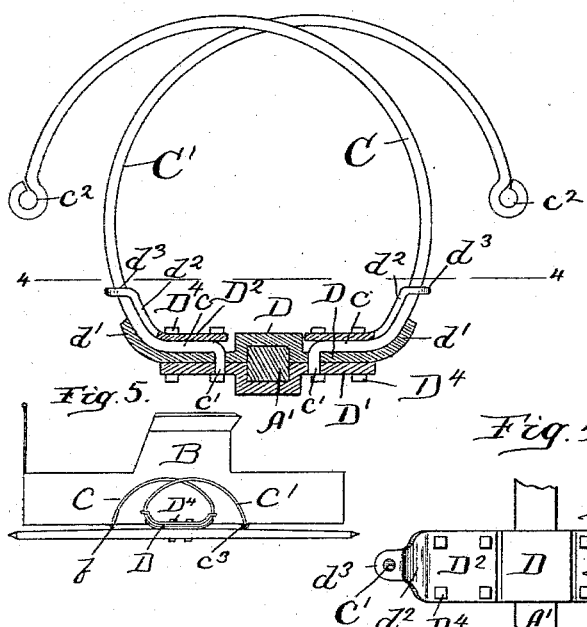
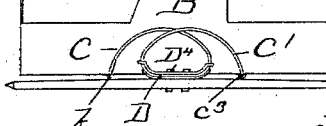
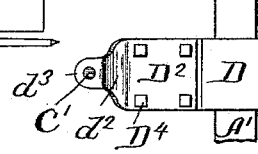
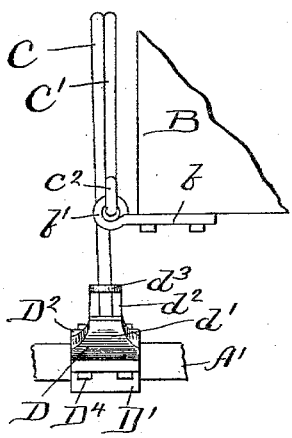
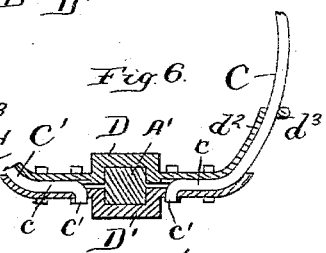
Witnesses:
Lew. E. Curtis
H. W. Munday.
Inventor:
Samuel D. Reynolds.
By Munday, Evarts & Adcock,
His Attorneys.

UNITED STATES PATENT OFFICE.

SAMUEL D. REYNOLDS, OF ROCHELLE, ASSIGNOR TO CHARLES E. BRADT, M. D. SHIPMAN, AND S. E. BRADT, OF DE KALB, ILLINOIS.

SPRING FOR VEHICLES.

SPECIFICATION forming part of Letters Patent No. 546,345, dated September 17, 1895.

Application filed December 7, 1892. Serial No. 454,333. (No model.)

*To all whom it may concern:*

Be it known that I, SAMUEL D. REYNOLDS, a citizen of the United States, residing in Rochelle, in the county of Ogle and State of Illinois, have invented a new and useful Improvement in Springs for Vehicles, of which the following is a specification.

My invention relates to vehicle-springs.

The object of my invention is to provide a durable and flexible spring of a simple and cheap construction for use upon vehicles and which will give the vehicle-body two widely-separated points of support above the axle, one to the front thereof and one to the rear thereof, so as to give greater security and an easier and steadier movement.

To this end my invention consists in a pair of curved spring-rods in connection with a suitable clamp, clip, or holder therefor, the curved spring-rods being bent into substantially circular form and so their upper ends hang downward, and said rods being also arranged to cross each other above the clamp or holder and to act reciprocally together, the one supporting and complementing the other, so that the bending of the two springs together will not tend to produce any jerky, swinging, or forward or backward movement of the body in respect to the axle.

My invention further consists in the novel devices and novel combinations of parts and devices herein shown and described, the same being more particularly pointed out in the claims.

In the accompanying drawings, which form a part of this specification, and in which similar letters of reference indicate like parts, I have shown my invention applied to an ordinary two-wheeled cart, the same being particularly applicable to this kind of vehicle or other vehicles having but a single axle or pair of wheels. It, however, may be used for other kinds of vehicles as well as for other purposes generally.

In the drawings, Figure 1 is a side elevation of a device embodying my invention. Fig. 2 is an enlarged detail view of the spring, the same being partly in section. Fig. 3 is an enlarged edge or front view of the spring, showing the clip for securing it to the wagon-body. Fig. 4 is a section taken in line 4 4 of Fig. 2 and showing in plan the clip by which the spring is secured to the axle. Fig. 5 shows the spring applied to an ordinary side-bar buggy or four-wheeled vehicle, and Fig. 6 shows a modification.

In the drawings, A represents the wheels of a vehicle, A' the axle, and B the vehicle-body.

C C' are two curved spring-rods, which are bent as shown and together constitute the spring. Each of these spring-rods has a bent stem portion $c$ to fit the clip or clamp and a projecting right-angled end $c'$, adapted to project through a hole $d$ in the clip D D', by which the spring is attached to the axle. The upper plate D of the clip is furnished with curved flanges $d'$ $d'$, conforming to the curvature of the spring C C' at the stem portion $c$ $c$ thereof. The clip D is further provided with clamp-plates $D^2$ $D^2$, by which the springs are securely clamped to the clip. These clamp-plates $D^2$ are provided with guide-arms $d^2$, having eyes $d^3$ to act as guides or supports for the spring-rods C C'. The guide-arms $d^2$ should conform in shape or curvature to the spring-rods C C'. The clamp-bolts $D^4$, by which the two parts of the clip are secured together around the axle, also pass through the clip-plates D $D^2$, and thus serve at the same time to securely clamp the spring-rods to the clip or holder D D'. The spring-rods C C' are furnished with eyes $c^2$ $c^2$ or other equivalent means for attaching the same to or connecting the same with the vehicle-body B.

$b$ represents a clip secured to the body B, the eye $b'$ of which links with the eye $c^2$ of the spring-rod.

As shown in Fig. 5, the free end of the spring-rod C or C' is furnished with a straight pivotal portion $c^3$, which fits in the clip $b$, attached to the body, so as to be capable of turning therein as a pivot. This illustrates one equivalent means of attaching the free ends of the spring to the body by a pivotal connection.

It will be observed that the spring-rods C C' are applied with the spring-rods lying longitudinally of the vehicle and thus gives two widely-separated points of attachment to the body. As the eyes or points of attachment $c^2$ $c^2$ are located one in front and the other in the rear of the axle, and as the two spring-rods C C' act reciprocally or complement each other by reason of their crossing each other above the axle, it will be readily understood that the body will move directly up and down as the springs close or expand.

The clip-plate D and clamp-plates $D^2$ $D^2$ together constitute the spring holder or clamp. It is preferable to make the plate D serve both as a clamp or holder plate for the spring and also as a clip-plate for securing the spring to the axle; but my invention is of course not confined to this double function of the plate D, and where the spring is desired to be attached to other things than an axle other forms of clips or means of attachment may be employed.

In the modification, Fig. 6, the clamp-plate $D^2$ for clamping the spring-rods is made integral with the clip-plate for clamping the axle—that is to say, but two clamp-plates are employed instead of three, as shown in Fig. 2.

I claim—

1. In a vehicle, the combination with a vehicle axle and body of a spring consisting of two crossing, curved spring rods C C', clip plates D D' for securing the same to the axle, and clamp plates $D^2$ $D^2$ for clamping or securing the ends of the spring to the clip, substantially as specified.

2. The combination with the body of a vehicle and the axle or side bars from which it is supported, of springs each consisting of two crossing spring rods bent into substantially circular form so that their free ends hang below the crown of the bends, said rods being secured to the axle or side bars in positions longitudinal of the vehicle and also having their free ends secured to the body at opposite sides of the point where they are attached to the axle or side bars, substantially as specified.

3. The combination with clamp plates, of a spring consisting of two curved and crossing spring rods, said clamp plate D having curved flanges $d'$ $d'$, substantially as specified.

4. The combination with clamp plates, of a spring consisting of two curved and crossing spring rods, said clamp plate having curved flanges $d'$ $d'$, and one of said clip plates having guide arms $d^2$, substantially as specified.

5. The combination with clamp plates D, $D^2$ $D^2$, of a spring consisting of two curved and crossing spring rods, said clamp plate D having curved flanges $d'$ $d'$, said clip plates $D^2$ $D^2$ having guide arms $d^2$, furnished with eyes $d^3$, substantially as specified.

SAMUEL D. REYNOLDS.

Witnesses:
EMMA HACK,
H. M. MUNDAY.